United States Patent
King (10) Patent No.: US 7,081,740 B2
(45) Date of Patent: Jul. 25, 2006

(54) DIGITAL DUTY CYCLE REGULATOR FOR DC/DC CONVERTERS

(75) Inventor: Paul Frederic King, Celebration, FL (US)

(73) Assignee: Kiawe Forest, LLC, Incline Village, NV (US)

( * ) Notice: Subject to any disclaimer, the term of this patent is extended or adjusted under 35 U.S.C. 154(b) by 0 days.

(21) Appl. No.: 11/008,052

(22) Filed: Dec. 8, 2004

(65) Prior Publication Data

US 2006/0119327 A1    Jun. 8, 2006

(51) Int. Cl.
G05F 1/652  (2006.01)
G05F 1/656  (2006.01)

(52) U.S. Cl. .................. 323/222; 323/284; 323/274
(58) Field of Classification Search .......... 323/222, 323/284, 274, 224, 282
See application file for complete search history.

(56) References Cited

U.S. PATENT DOCUMENTS 6,801,024 B1 * 10/2004 Bernardon ............... 323/224
6,815,936 B1 * 11/2004 Wiktor et al. ............ 323/282
6,853,169 B1 *  2/2005 Burstein et al. .......... 323/272
6,891,355 B1 *  5/2005 Kernahan ................. 323/282
6,933,706 B1 *  8/2005 Shih ........................ 323/222
6,933,710 B1 *  8/2005 Shieh ....................... 323/282
6,965,221 B1 * 11/2005 Lipcsei et al. ............ 323/283
6,977,489 B1 * 12/2005 Isham ...................... 323/272

* cited by examiner

Primary Examiner—Bao Q. Vu

(57) ABSTRACT

A digitally-controlled, DC/DC converter includes at least one switched-mode power stage for the purpose of converting an input voltage (Vin) into an output voltage (Vout); the power stage including at least one controllable switching device, which is turned ON and OFF by a control device with temporal resolution $\Delta t$. The converter further includes a duty cycle control mechanism for controlling the duty cycle of the controllable switching device, the duty cycle control mechanism including a mechanism for estimating the target duty cycle, a duty cycle quantization mechanism for determining, for a target duty cycle estimate, a set of quantized ON time/OFF time pairs suitable for controlling the switching device, and a sequencing mechanism for determining the turn ON and turn OFF times of said controllable switching device by choosing, cycle by cycle, an ON time/OFF time pair from the set of quantized ON time/OFF time pairs, choosing in such a manner that the time-averaged value of the resultant duty cycle is equivalent to the estimated target duty cycle.

26 Claims, 9 Drawing Sheets

| DT | DQmin | | DQmax | |
|---|---|---|---|---|
| | ON | OFF | ON | OFF |
| 1 | 0 | 15 | 1 | 15 |
| 2 | 0 | 15 | 1 | 15 |
| 3 | 0 | 15 | 1 | 15 |
| ••• | ••• | ••• | ••• | ••• |
| 55 | 7 | 10 | 7 | 9 |
| 56 | 7 | 10 | 8 | 9 |
| 57 | 7 | 9 | 7 | 8 |
| 58 | 7 | 9 | 7 | 8 |
| 59 | 7 | 9 | 7 | 8 |
| 60 | 8 | 9 | 8 | 7 |
| 61 | 8 | 9 | 8 | 8 |
| 62 | 8 | 9 | 8 | 8 |
| 63 | 8 | 9 | 8 | 8 |
| 64 | 8 | 9 | 9 | 8 |
| 65 | 8 | 8 | 9 | 8 |
| 66 | 8 | 8 | 9 | 8 |
| 67 | 8 | 9 | 9 | 8 |
| 68 | 8 | 8 | 9 | 7 |
| 69 | 9 | 7 | 9 | 7 |
| 70 | 9 | 7 | 10 | 7 |
| 71 | 9 | 8 | 10 | 7 |
| 72 | 9 | 7 | 10 | 7 |
| 73 | 9 | 7 | 9 | 7 |
| 74 | 10 | 7 | 10 | 6 |
| 75 | | | | 6 |
| 76 | | | | |
| ••• | ••• | ••• | ••• | ••• |
| 125 | 15 | 1 | 15 | 0 |
| 126 | 15 | 1 | 15 | 0 |
| 127 | 15 | 1 | 15 | 0 |

| DT | Sequence Pattern | |
|---|---|---|
| | Pattern Number (PN) | "0" Designator |
| 1 | 152 | 1 |
| ... | ... | ... |
| 64 | 248 | 1 |
| ... | ... | ... |
| 127 | 152 | 0 |

When this bit is set to 0, "0"s in the pattern data designate DQmin cycles.

| PN | Sequence Pattern Data |
|---|---|
| 128 - 135 | 1111111111111111111111111111111111111111 |
| 136 -143 | 1111111101111111111111111111111111111111 |
| 144 - 151 | 1110111111111111111111011111111111111111 |
| 152 - 159 | 1110111111111111111011111111111110111111 |
| ... | ... |
| 248 - 255 | 1010101010101010101010101010101010101010 |

DIGITAL DUTY CYCLE REGULATOR FOR DC/DC CONVERTERS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The invention pertains generally to the field of power conversion, and more particularly to digitally-controlled switched-mode DC/DC converters.

A broad class of switched-mode DC/DC power converters exists with the property that the ratio of the average output voltage to the input voltage is determined by the average duty cycle of a controllable switching device within the power conversion stage of the converter. Examples include buck, boost, inverting buck-boost, forward, and flyback converters, operated in the continuous conduction mode (CCM). Where the load on the power converter is steady, or there is no requirement to track changes in load with minimal output voltage error, regulation of these converters is accomplished by continually estimating the target duty cycle (the target duty cycle being the duty cycle essential to achieve the desired output voltage) and continually adjusting the duty cycle of the switching device to track target duty cycle estimates. In this case, the act of regulation consists of controlling, cycle by cycle, the duty cycle of the switching device in accordance with target duty cycle estimates, so that the average output voltage is equivalent to the desired output voltage.

Regulation mechanisms for this purpose generally incorporate a pulse width modulation (PWM) mechanism and a target duty cycle estimation mechanism, where the former generates an ON pulse appropriate to the realization of the target duty cycle estimate generated by the latter. The target duty cycle estimation mechanism is typically a feedback mechanism, driven by the output voltage error, but it could as well be a feedforward mechanism, driven by the input voltage, or it could be some combination of the two.

The most commonly used PWM mechanisms are analog in nature; that is they accept as input a continuously variable analog signal representing the desired duty cycle, and they output pulses of continuously variable width. As in other previously analog fields, continuous advances in integrated circuit technology have stimulated the application of digital techniques to the field of power conversion. As a result, the first digital regulation mechanisms, replacing analog PWM mechanisms, have been developed and are being commercialized. It is the nature of such mechanisms that the generated pulse widths are quantized—a consequence of the temporal resolution of the digital regulation mechanism. If the temporal resolution of the regulation mechanism is $\Delta t$, then the pulse widths are constrained to be integral multiples of $\Delta t$. Furthermore, switching cycles, spanning consecutive ON and OFF pulses, are likewise constrained to be integral multiples of $\Delta t$.

One challenge to those who would apply digital regulation mechanisms to power converters, especially DC/DC converters employed in battery-powered mobile applications, is the challenge of achieving acceptable application performance with digital regulation mechanisms. Quantization of pulse widths translates into quantized duty cycles, which typically translates into a requirement for a sequencing mechanism to realize, via time-averaging, the duty cycle precision essential to achieve the desired output voltage. This requirement, in itself, presents an implementation challenge to designers of digital duty cycle regulation mechanisms; a number of practical solutions may be found in the prior art (cf. U.S. Pat. No. 5,272,614 and U.S. Pat. No. 5,886,513). It remains, however, to mitigate the effects of quantization on application performance.

To understand the nature of this challenge, consider a DC/DC converter in a battery powered mobile application. The switching frequency is typically set in the neighborhood of 1 MHz, to minimize the size and cost of discrete components and maximize the operating efficiency of the converter. A digital regulation mechanism operating at 16 MHz would be able to generate pulses widths of 0, 1/16 usec, 2/16 usec, 3/16 usec . . . 16/16 usec. Assuming a fixed switching frequency, 17 instantaneous duty cycles (including 0 and 1) could be applied. One method for time-averaging to a target duty cycle would be to construct a sequence comprised of two quantized duty cycles, one smaller than the target duty cycle, and the other larger. Two distinct embodiments of this concept can be found in the prior art (cf. U.S. Pat. No. 5,272,614 and U.S. Pat. No. 5,886,513). In each case, the sequencing mechanism constructs, from a set of two quantized duty cycles, a sequencing pattern appropriate to realize, via time-averaging, the estimated target duty cycle. At their best, however, these sequencing mechanisms may not be able to limit output voltage ripple to an acceptable level . . . in which case the only obvious recourse for manufacturers of regulators is to improve the temporal resolution of the digital regulation mechanism . . . i.e., boost the clock frequency.

But boosting the clock frequency to mitigate the effects of quantization on output voltage ripple may compromise cost and efficiency metrics. For example, the complexity and, consequently, the cost of the digital regulation mechanism are likely to increase as well as the power dissipation. Moreover, the increased cost and power dissipation would be further multiplied, if the requirement to boost the clock frequency should prevent the integration (at a substrate level) of the digital regulation mechanism with other electronic componentry.

Clearly there is a need for digital control methods that mitigate the requirement for higher clock frequencies solely for the purpose of achieving acceptable output voltage ripple in a broad class of DC/DC converters.

BRIEF SUMMARY OF THE INVENTION

The primary objective of this invention is to provide digital control methods that mitigate the requirement for higher clock frequencies solely for the purpose of achieving acceptable output voltage ripple in a broad class of DC/DC converters.

To this end, a digital duty cycle control mechanism, including a mechanism for estimating the target duty cycle, a novel duty cycle quantization mechanism for determining, for a target duty cycle estimate, a set of two quantized ON time/OFF time pairs suitable for controlling said controllable switching device, and a novel sequencing mechanism for determining the turn ON and turn OFF times of the switching device by choosing, cycle by cycle, an ON time/OFF time pair from said set of two ON time/OFF time pairs, choosing in such a manner that the time-averaged value of the resultant duty cycle is approximately equivalent to the estimated target duty cycle, is disclosed.

The novelty of the duty cycle quantization mechanism follows from the insight that the output voltage ripple resulting from a sequence of quantized switching cycles (a cycle being the sum of consecutive ON and OFF times) generated to achieve a time-averaged target duty cycle decreases as the number of quantized switching cycles available to generate the sequence increases; and that the number available can be expanded by relaxing the (prior art) premise that all switching cycles be fixed in length, cycle by cycle, under nominal load conditions. If, for example, the switching cycle were allowed to shrink/stretch by the temporal resolution of the digital regulation mechanism, the number of available switching cycles increases three-fold, with the potential for comparable reductions in output voltage ripple.

The novelty of the sequencing mechanism follows from the insight that an adaptation of Breshenham's Algorithm, which provides a computationally efficient method for generating a straight line across a matrix of pixels, could be applied to the generation of a sequence of duty cycles that time-average to a target duty cycle.

In accordance with the present invention, a method is provided for converting an input voltage to an output voltage by means of a switched-mode DC/DC converter; the input voltage being converted into an output voltage with the aid of a power stage, including at least one controllable switch, which is turned ON and turned OFF by a control device characterized in that owing to the temporal resolution of the control device ($\Delta t$), both the turn ON and turn OFF times of the controllable switching device are constrained to be integral multiples of $\Delta t$.

Central to this method is a duty cycle control mechanism for controlling the duty cycle of the controllable switching device, the duty cycle control mechanism including a mechanism for estimating the target duty cycle; a duty cycle quantization mechanism for determining, for a target duty cycle estimate, a set of two quantized ON time/OFF time pairs suitable for controlling said controllable switching device, characterized in that the quantized ON time and OFF time of each pair (in said set) are determined independently of each other; that is, the sum of the ON time and OFF time is not fixed; but may vary, pair to pair, constrained to a set of discrete values $\{Tswi\}$ ($i=1, 2, \ldots I$) where Tswi is an integral multiple of $\Delta t$; and a sequencing mechanism for determining turn ON and turn OFF times of said controllable switching device by choosing, cycle by cycle, an ON time/OFF time pair from said set of two ON time/OFF time pairs, choosing in such a manner that the time-averaged value of the resultant duty cycle is approximately equivalent to the estimated target duty cycle.

In accordance with the present invention, a switched-mode DC/DC converter is provided, comprising:

a power stage for the purpose of converting an input voltage into at least one output voltage, the power stage including at least one controllable switching device; and a control device for the purpose of turning ON and turning OFF the controllable switching device, characterized in that owing to the temporal resolution of the control device ($\Delta t$), both the turn ON and turn OFF times of the controllable switching device are constrained to be integral multiples of $\Delta t$; and a duty cycle control mechanism for controlling the duty cycle of said controllable switching device, comprising:

a mechanism for estimating the target duty cycle; and a duty cycle quantization mechanism for determining, for a target duty cycle estimate, a set of two quantized ON time/OFF time pairs suitable for controlling said controllable switching device, characterized in that the quantized ON time and OFF time of each pair (in said set) are determined independently of each other; that is, the sum of the ON time and OFF time is not fixed; and may vary, pair to pair, constrained to a set of discrete values $\{Tswi\}$ ($i=1, 2, \ldots I$) where Tswi is an integral multiple of $\Delta t$; and a sequencing mechanism for determining the turn ON and turn OFF times of said controllable switching device by choosing, cycle by cycle, an ON time/OFF time pair from said set of two ON time/OFF time pairs, choosing in such a manner that the time-averaged value of the resultant duty cycle is approximately equivalent to the estimated target duty cycle.

In a preferred embodiment, the sequencing mechanism determines turn ON and turn OFF times by choosing, cycle by cycle, an ON time/OFF time pair from a set of two quantized ON time/OFF time pairs extracted from a table (of sets) indexed by the estimated target duty cycle, following a sequence generated by a modified Breshenham algorithm.

In a second preferred embodiment, the sequencing mechanism determines turn ON and turn OFF times by choosing, cycle by cycle, an ON time/OFF time pair from a set of two quantized ON time/OFF time pairs extracted from a table (of sets) indexed by the estimated target duty cycle, following a sequence extracted from a table (of sequences) indexed by the estimated target duty cycle.

Those skilled in the art will understand that the digital duty cycle control mechanism of the present invention may be implemented in mixed signal circuitry including logic circuits and/or a microprocessor with appropriate software or firmware. Further, those skilled in the art will understand that the digital duty cycle control mechanism of the present invention may be applied to any DC/DC converter topology, including but not limited to buck, boost, inverting buck-boost, forward, and flyback converters.

The following figures and descriptions disclose other aspects and advantages of the proposed invention.

BRIEF DESCRIPTION OF THE DRAWINGS

Various aspects and features of the present invention may be understood by examining the following figures.

DETAILED DESCRIPTION OF THE INVENTION

A broad class of switched-mode DC/DC power converters exists with the property that the ratio of the average output voltage to the input voltage is determined by the average duty cycle of a controllable switching device within the power conversion stage of the converter. Examples include buck, boost, inverting buck-boost, forward, and flyback converters, operated in the continuous conduction mode (CCM). Where the load on the power converter is steady, or there is no requirement to track changes in load with minimal output voltage error, regulation of these converters is accomplished by continually estimating the target duty cycle (the target duty cycle being the duty cycle essential to achieve the desired output voltage) and continually adjusting the duty cycle of the switching device to track target duty cycle estimates. In this case, the act of regulation consists of controlling, cycle by cycle, the duty cycle of the switching device in accordance with target duty cycle estimates, so that the average output voltage is equivalent to the desired output voltage.

Regulation mechanisms for this purpose generally incorporate a pulse width modulation (PWM) mechanism and a target duty cycle estimation mechanism, where the former generates an ON pulse appropriate to the realization of the target duty cycle estimate generated by the latter. The target duty cycle estimation mechanism is typically a feedback mechanism, driven by the output voltage error, but it could as well be a feedforward mechanism, driven by the input voltage, or some combination of the two.

The most commonly used PWM mechanisms are analog in nature; that is they accept as input a continuously variable analog signal representing the desired duty cycle, and they output pulses of continuously variable width. As in other previously analog fields, continuous advances in integrated circuit technology have stimulated the application of digital techniques to the field of power conversion. As a result, the first digital regulation mechanisms, replacing analog PWM mechanisms, have been developed and are being commercialized. It is the nature of such mechanisms that the generated pulse widths are quantized—a consequence of the temporal resolution of the digital regulation mechanism. If the temporal resolution of the regulation mechanism is $\Delta t$, then the pulse widths are constrained to be integral multiples of $\Delta t$. Furthermore, switching cycles, spanning consecutive ON and OFF pulses, are likewise constrained to be integral multiples of $\Delta t$.

Figure 1:
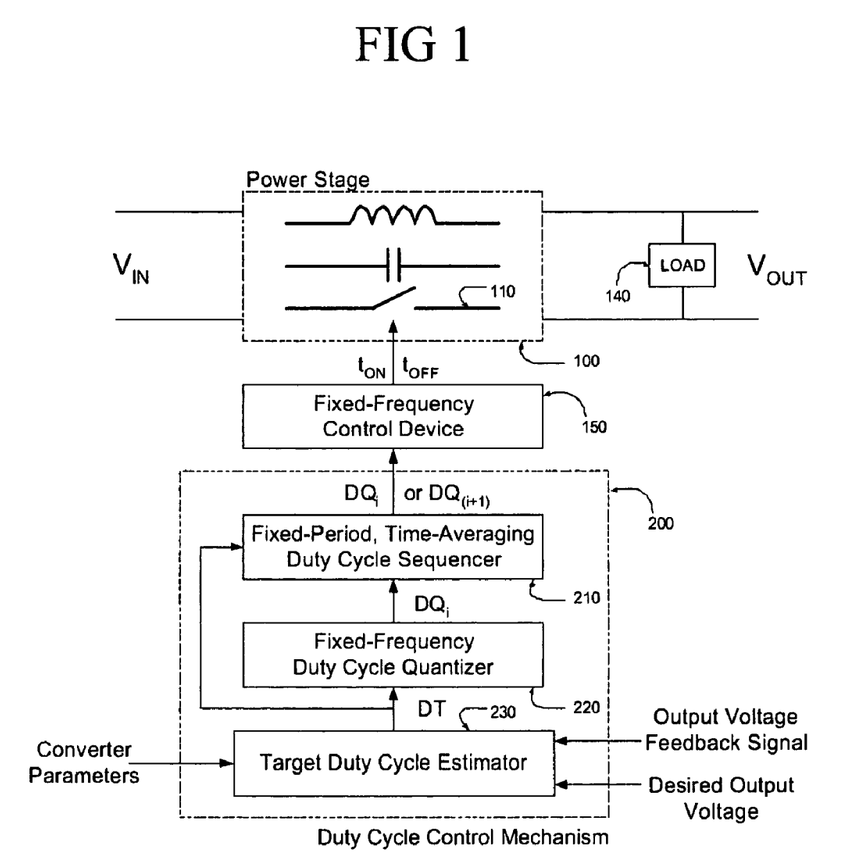
FIG. 1 is a block diagram illustrating a prior art digital duty cycle control mechanism.

FIG. 1 describes a prior art switched-mode DC/DC power converter (cf. U.S. Pat. No. 5,272,614) comprising power stage 100 for the purpose of converting input voltage Vin to output voltage Vout; fixed-frequency control device 150 for the purpose of turning ON and turning OFF the controllable switching device 110, included in power stage 100; and duty cycle control mechanism 200 for controlling the duty cycle of switching device 110.

The fixed-frequency control device 150 is characterized in that, owing to its temporal resolution, $\Delta t$, both the turn ON and turn OFF times of the controllable switching device 110 are constrained to be integral multiples of $\Delta t$. Because control device 150 is a fixed-frequency control device, it turns ON switching device 110 at fixed intervals, Tsw, where Tsw is likewise an integral multiple of $\Delta t$. Control device 150 turns OFF switching device 110 by translating (if necessary) duty cycle input into ON time, cycle by cycle.

The duty cycle control mechanism is comprised of a target duty cycle estimator 230, a mechanism for generating, from output voltage feedback, an estimate (DT) of the target duty cycle, the target duty cycle being the duty cycle essential to achieve the desired output voltage, Vdo; a fixed-frequency duty cycle quantizer 220 for generating a quantized duty cycle (DQi) by rounding the estimated target duty cycle (DT) down to the nearest ratio of (quantized) ON time to Tsw; and a fixed-period time-averaging duty cycle sequencer 210 for determining the turn ON and turn OFF times of switching device 110, in such a manner that the time-averaged value of the resultant duty cycle most closely approximates the estimated target duty cycle, DT.

In a digital implementation, the target duty cycle estimator 230 frequently takes the form of a digital PID (proportional-integral-differential) filter, operating on the output voltage error (the difference between the actual output voltage and the desired output voltage). The fixed-period time-averaging duty cycle sequencer 210 constructs a fixed-length sequence of cycles, mixing DQi cycles with DQi+1 cycles (DQi+1=DQi+$\Delta t$/Tsw), to achieve a time-averaged duty cycle greater than DQi, but less than DQi+1. For example, consider a fixed-period time-averaging sequencing mechanism for generating a sequence of four cycles that time-average to DQi+n/4×$\Delta t$/Tsw, where n=0, 1, . . . 4, and n is chosen to most closely approximate the estimated target duty cycle, DT. In this case, for values of DT approximately midway between DQi and DQi+1, n would be chosen to be two, and the four-cycle sequence might be DQi, DQi+1, DQi, and DQi+1.

While the fixed-period time-averaging sequencing mechanism provides for the situation where the time to generate an estimate of the target duty cycle is long compared to the switching cycle, there are performance limitations implicit in the duty cycle control mechanism described above. One is the implication of a bias in the steady state error voltage; because of the fixed-period sequencing mechanism, it is impossible to achieve an unbiased output voltage error. Another is the duty-cycle-quantization-induced output voltage ripple, which varies with $\Delta t$.

Figure 2:
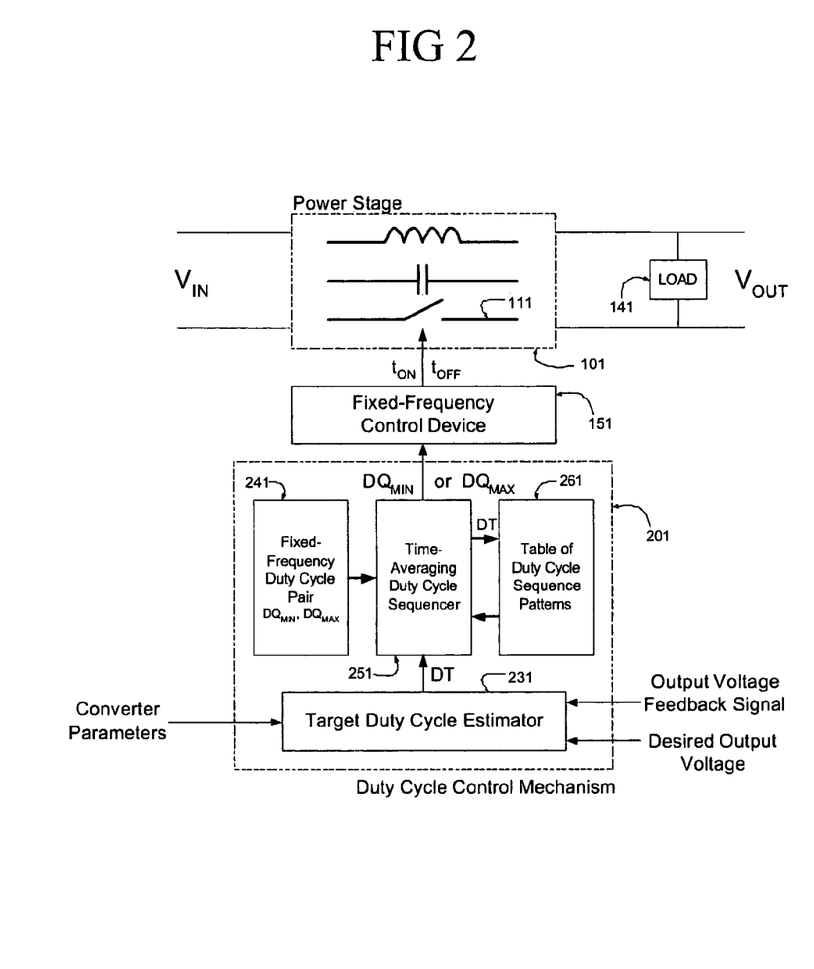
FIG. 2 is a block diagram illustrating another prior art digital duty cycle control mechanism.

FIG. 2 describes a prior art switched-mode DC/DC power converter (cf. U.S. Pat. No. 5,886,513) comprising power stage 101 for the purpose of converting input voltage Vin to output voltage Vout; fixed-frequency control device 151 for the purpose of turning ON and turning OFF the controllable switching device 111, included in power stage 101; and duty cycle control mechanism 201 for controlling the duty cycle of switching device 111.

The fixed-frequency control device 151 is characterized in that, owing to its temporal resolution, $\Delta t$, both the turn ON and turn OFF times of the controllable switching device 111 are constrained to be integral multiples of $\Delta t$. Because control device 151 is a fixed-frequency control device, it turns ON switching device 111 at fixed intervals, Tsw, where Tsw is likewise an integral multiple of $\Delta t$. Control device 151 turns OFF switching device 111 by translating (if necessary) duty cycle input into ON time, cycle by cycle.

The duty cycle control mechanism is comprised of a target duty cycle estimator 231, a mechanism for generating, from output voltage feedback, an estimate (DT) of the target duty cycle, the target duty cycle being the duty cycle essential to achieve the desired output voltage, Vdo, and a time-averaging duty cycle sequencer 251 for determining the turn ON and turn OFF times of switching device 111, in such a manner that the time-averaged value of the resultant duty cycle most closely approximates the estimated target duty cycle, DT.

In a digital implementation, the target duty cycle estimator 231 frequently takes the form of a digital PID (proportional-integral-differential) filter, operating on the output voltage error (the difference between the actual output voltage and the desired output voltage). The time-averaging duty cycle sequencer 251, constructs a sequence of cycles, mixing DQmin cycles with DQmax cycles (DQmin and DQmax having been specified to span a range of input voltage specific to the application). In this case, the construction of the sequence is accomplished by choosing, cycle by cycle, DQmin or DQmax, following a duty cycle sequence pattern extracted from a table of duty cycle sequence patterns 261 indexed by the estimated target duty cycle, DT, to generate a sequence that time-averages to the estimated target duty cycle, DT.

While there are computational advantages to having a table of sequence patterns available, the table does require memory, the content of which is application-dependent. Moreover, the duty cycle control mechanism described here has implicit performance limitations similar to those of the duty cycle control mechanism described in FIG. 1. First, there is the implication of a bias in the steady state error voltage; because of the finite period implicit in the sequencing mechanism, it is impossible to achieve an unbiased output voltage error. This bias can be reduced to a tolerable level by extending the length of the sequence patterns, at a cost of additional memory. Second, duty-cycle-quantization-induced output voltage ripple can become intolerable if the range of input voltage, and accordingly the spread of DQmin and DQmax, is too wide.

Figure 3:
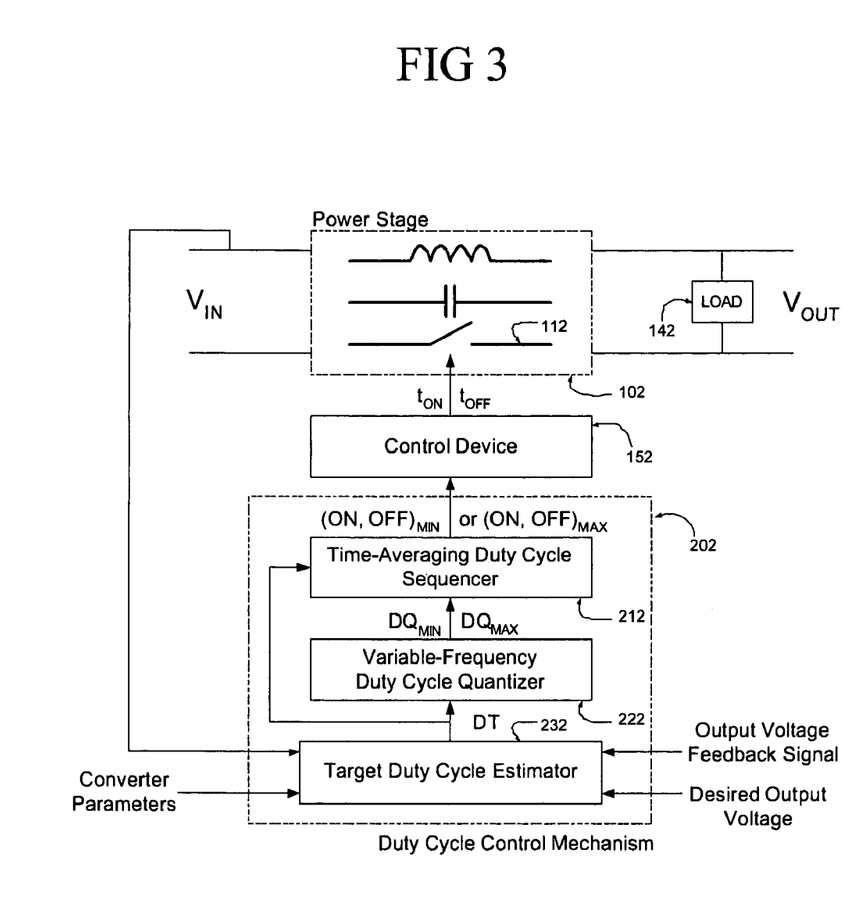
FIG. 3 is a block diagram illustrating a digital duty cycle control mechanism according to present invention.

FIG. 3 describes a switched-mode DC/DC power converter according to the present invention, comprising power stage 102 for the purpose of converting input voltage Vin to output voltage Vout; control device 152 for the purpose of turning ON and turning OFF the controllable switching device 112, included in power stage 102; and duty cycle control mechanism 202 for controlling the duty cycle switching device 112.

The control device 152 is further characterized in that, owing to the temporal resolution of the control device, $\Delta t$, both the turn ON and turn OFF times of the controllable switching device are constrained to be integral multiples of $\Delta t$. Because control device 152 is not a fixed-frequency control device, it must input ON times and OFF times in order to turn ON and turn OFF switching device 112.

The duty cycle control mechanism is comprised of a target duty cycle estimator 232, a mechanism for estimating, from output voltage feedback or input voltage feedforward or a combination of both, the duty cycle essential to achieve the desired output voltage, Vdo; a variable-frequency duty cycle quantizer 222 for determining, for a target duty cycle estimate, a pair of quantized duty cycles (DQmin and DQmax) bracketing the target duty cycle DT, and otherwise suited for controlling switching device 112, and a time-averaging duty cycle sequencer 212 for determining the turn ON and turn OFF times of switching device 112 by choosing, cycle by cycle, DQmin or DQmax (and its corresponding ON time/OFF time pair), choosing in such a manner that the time-averaged value of the resultant duty cycle is approximately equivalent to the estimated target duty cycle, DT.

In a digital implementation, the target duty cycle estimator 232 frequently takes the form of a digital PID (proportional-integral-differential) filter, operating on the output voltage error (the difference between the actual output voltage and the desired output voltage). According to the present invention, the filter may operate on input voltage in lieu of or in addition to the output voltage error.

The variable-frequency duty cycle quantizer 222 is characterized in that both the quantized ON time and OFF time of DQmin and the quantized ON time and OFF time of DQmax are determined independently of each other; that is, the sum of the ON time and OFF time is not fixed; and may vary, pair to pair, constrained to a set of discrete values {Tswi} (i=1, 2, . . . I) where Tswi is an integral multiple of $\Delta t$. As the switching cycle possibilities are multiplied, so the number of duty cycles bracketing DT is multiplied; and it becomes easier to select duty cycles close astride DT, a critical factor in the minimization of quantization-induced output voltage ripple. One method of choosing DQmin and DQmax is to search the space of quantized duty cycles in the neighborhood of DT and choose on the basis of proximity to DT. Experience has taught that these choices may be problematic (with respect to output voltage ripple) when one of the chosen duty cycles is very close to DT and the other, relatively far away. In that case, it is preferable to reject the closer in favor of the second (or third) closest duty cycle on the on the same "side" of DT as the rejected duty cycle.

The time-averaging duty cycle sequencer determines the turn ON and turn OFF times of switching device 112 from a sequence of ON time/OFF time pairs generated as a byproduct of the sequence of duty cycles generated by sequencing DQmin and DQmax in such a manner that the time-averaged value of the resultant duty cycle is approximately equivalent to the estimated target duty cycle, DT. There are number of ways to generate such a sequence. One method is detailed in the discussion of time-averaging duty cycle sequencer 253 of duty cycle control mechanism 203 of the converter in FIG. 4. Another method is detailed in the discussion of time-averaging duty cycle sequencer 254 of duty cycle control mechanism 204 of the converter in FIG. 5.

While duty cycle control mechanism 202 has implicit performance limitations similar in nature to those of prior art fixed-frequency duty cycle control mechanisms, the effects of finite period time-averaging and duty cycle quantization on performance are substantially reduced, without introducing application dependencies. In a typical battery-powered mobile application, the output voltage ripple generated by a buck converter employing the duty cycle control mechanism of the present invention was reduced by 60% when the switching cycle (1.25 MHz) was allowed to vary ± one clock period (from a nominal 16).

Figure 4:
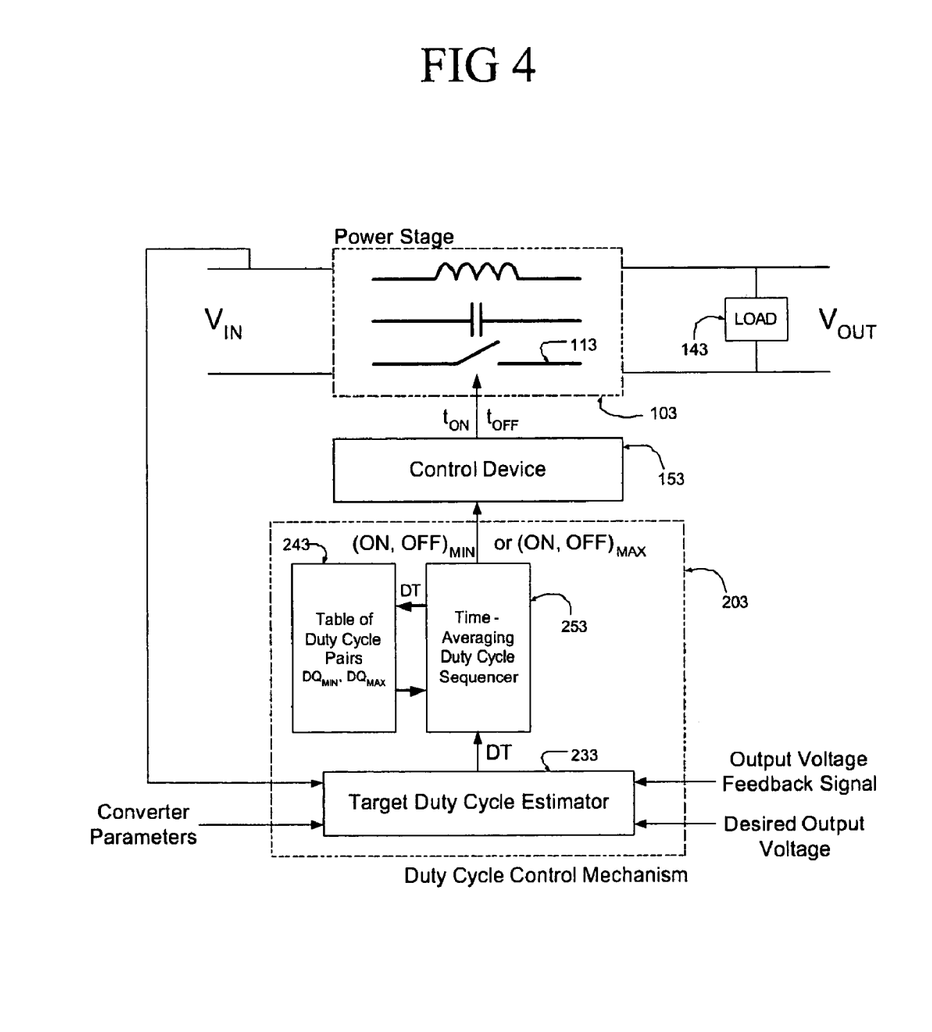
FIG. 4 is a block diagram illustrating one embodiment of a digital duty cycle control mechanism according to the present invention.
Figure 5:
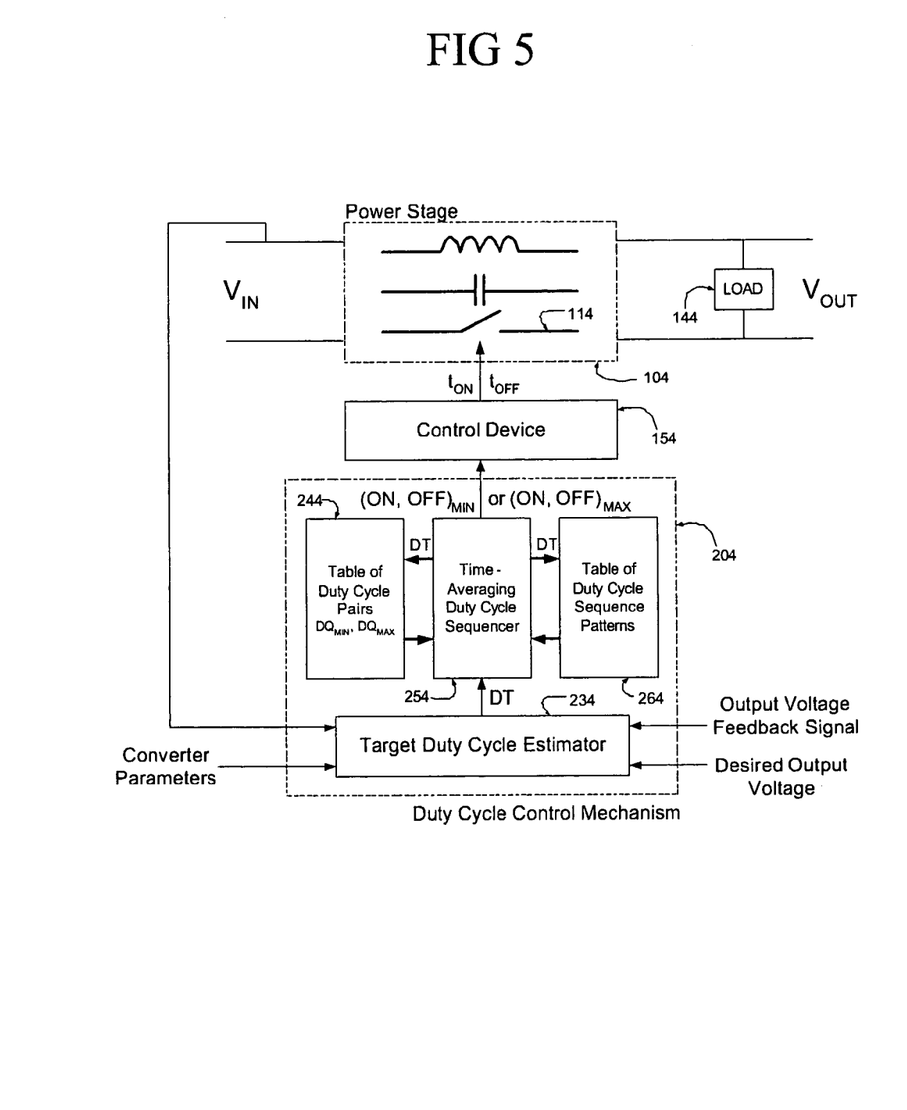
FIG. 5 is a block diagram illustrating another embodiment of a digital duty cycle control mechanism according to the present invention.

FIGS. 4 and 5 describe preferred embodiments of switched-mode DC/DC power converters according to the present invention, differing only in the construction of the duty cycle control mechanisms. The duty cycle control mechanism of the converter of FIG. 4 is comprised of a target duty cycle estimator 233, a mechanism for generating, from output voltage feedback or input voltage feedforward or a combination of both, an estimate (DT) of the target duty cycle, the target duty cycle being the duty cycle essential to achieve the desired output voltage, Vdo, and a time-averaging duty cycle sequencer 253 for determining the turn ON and turn OFF times of switching device 113, in such a manner that the time-averaged value of the resultant duty cycle is approximately equivalent to the estimated target duty cycle, DT.

In a digital implementation, the target duty cycle estimator 233 frequently takes the form of a digital PID (proportional-integral-differential) filter, operating on the output voltage error (the difference between the actual output voltage and the desired output voltage). According to the present invention, the filter may operate on input voltage in lieu of or in addition to the output voltage error.

The time-averaging duty cycle sequencer 253, constructs a sequence of cycles, mixing DQmin cycles with DQmax cycles, where DQmin and DQmax comprise a duty cycle pair, extracted from a table of duty cycle pairs 243 indexed by the estimated target duty cycle, DT. In this case, the sequencing mechanism chooses, cycle by cycle, DQmin or DQmax (and its corresponding ON time/OFF time pair), using a modified Breshenham algorithm, to generate a sequence that time-averages to the estimated target duty cycle, DT.

Figure 6:
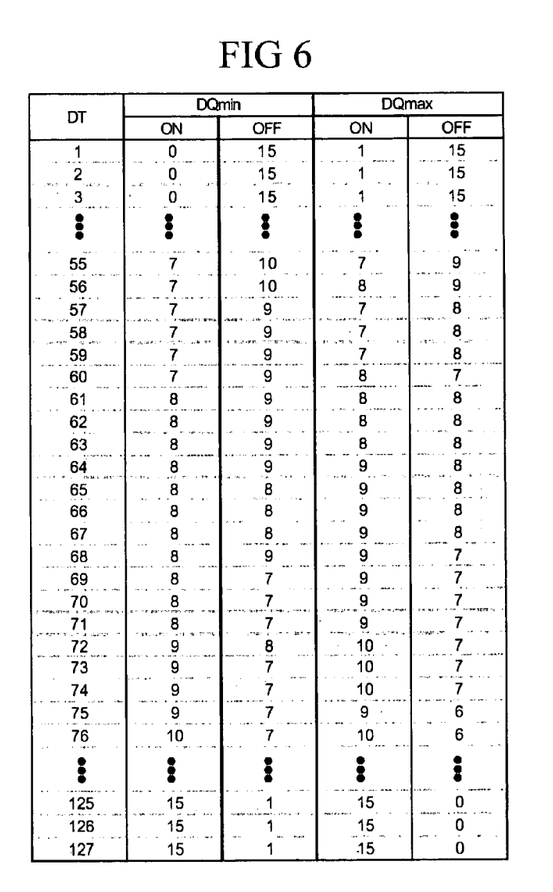
FIG. 6 is a table of variable frequency duty cycle pairs indexed by the estimated target duty cycle.

The content and construction of the table of duty cycle pairs 243 is described in FIG. 6. The values of DQmin and DQmax are determined using the method of variable- frequency duty cycle quantizer 222 of duty cycle control mechanism 202 of the converter in FIG. 3. The associated ON time/OFF time pairs, designated (ON, OFF)min and (ON, OFF)max, are then derived trivially from DQmin and DQmax.

To estimate the size of table 243, consider the example of a duty cycle control mechanism with a 20 MHz clock, controlling a power stage with a nominal switching frequency of 1.25 MHz (16 clocks per nominal switching cycle), where switching cycles are allowed to vary ± one clock period from nominal. If the ON and OFF times associated with DQmax were encoded relative to the ON and OFF times associated with DQmin, the resulting table could be organized as 12×128.

The time-averaging duty cycle sequencer 253 operates analogously to a class of line drawing mechanisms that employ Breshenham's Algorithm to generate apparently straight lines on matrix imaging devices. These mechanisms generate apparently straight lines between two points by moving, pixel by pixel, from a beginpoint to an endpoint, choosing pixels along the way in such a manner that chosen pixels lie close astride a perfectly straight line connecting the points. In the line drawing illustration of FIG. 7A, m is greater than n, making the x-axis the driving axis. Accordingly, Breshenham's Algorithm advances toward the endpoint by choosing, at successive points along the x-axis, to move either parallel to the x axis (RIGHT) or along a diagonal (UP), as shown.

Figure 7A:
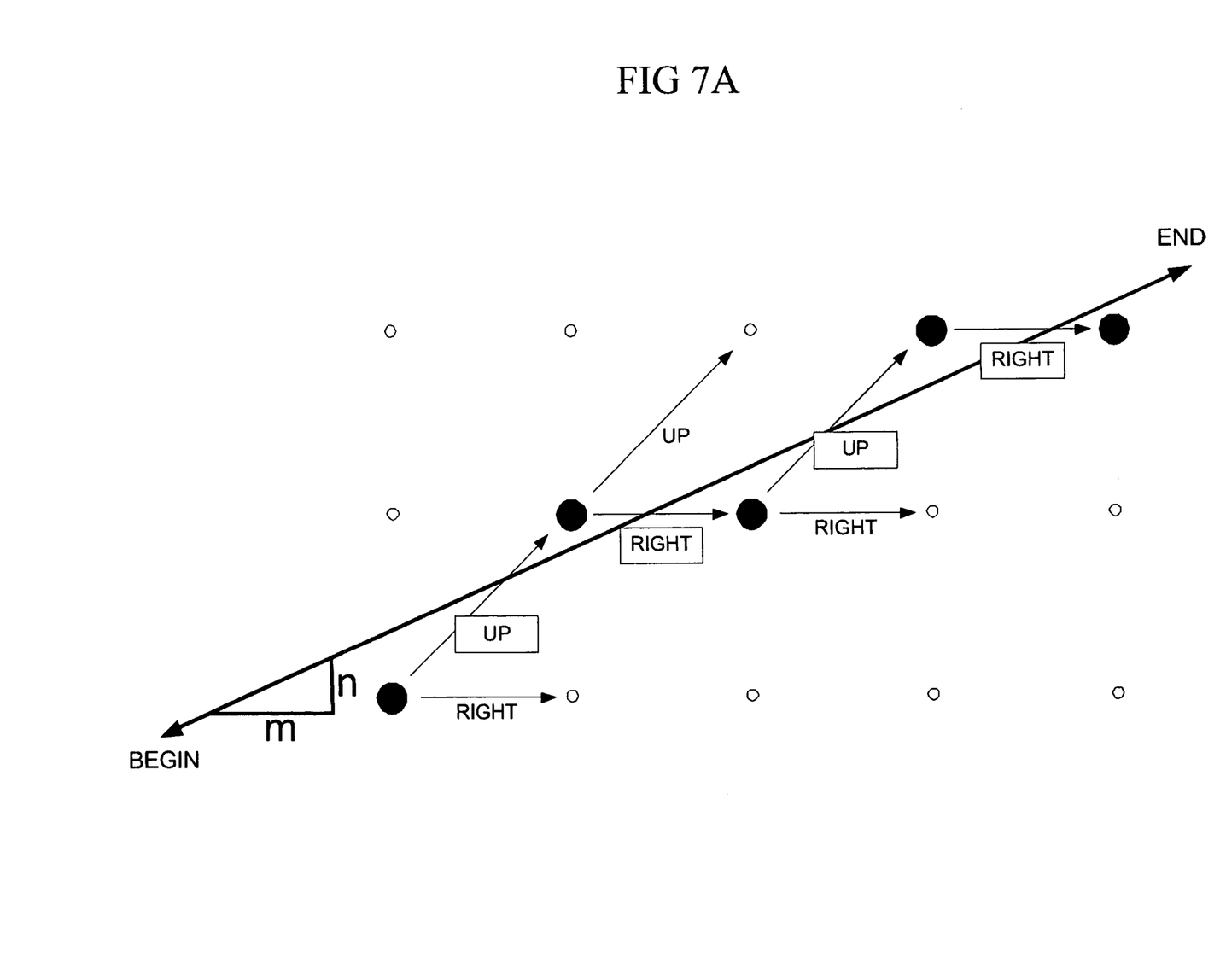
FIG. 7a is an illustration of Breshenham's Algorithm in a line drawing application.

At each point, the decision has the effect of minimizing the difference between the ratio of cumulative x displacement to cumulative y displacement, and the ratio m/n.

Figure 7B:
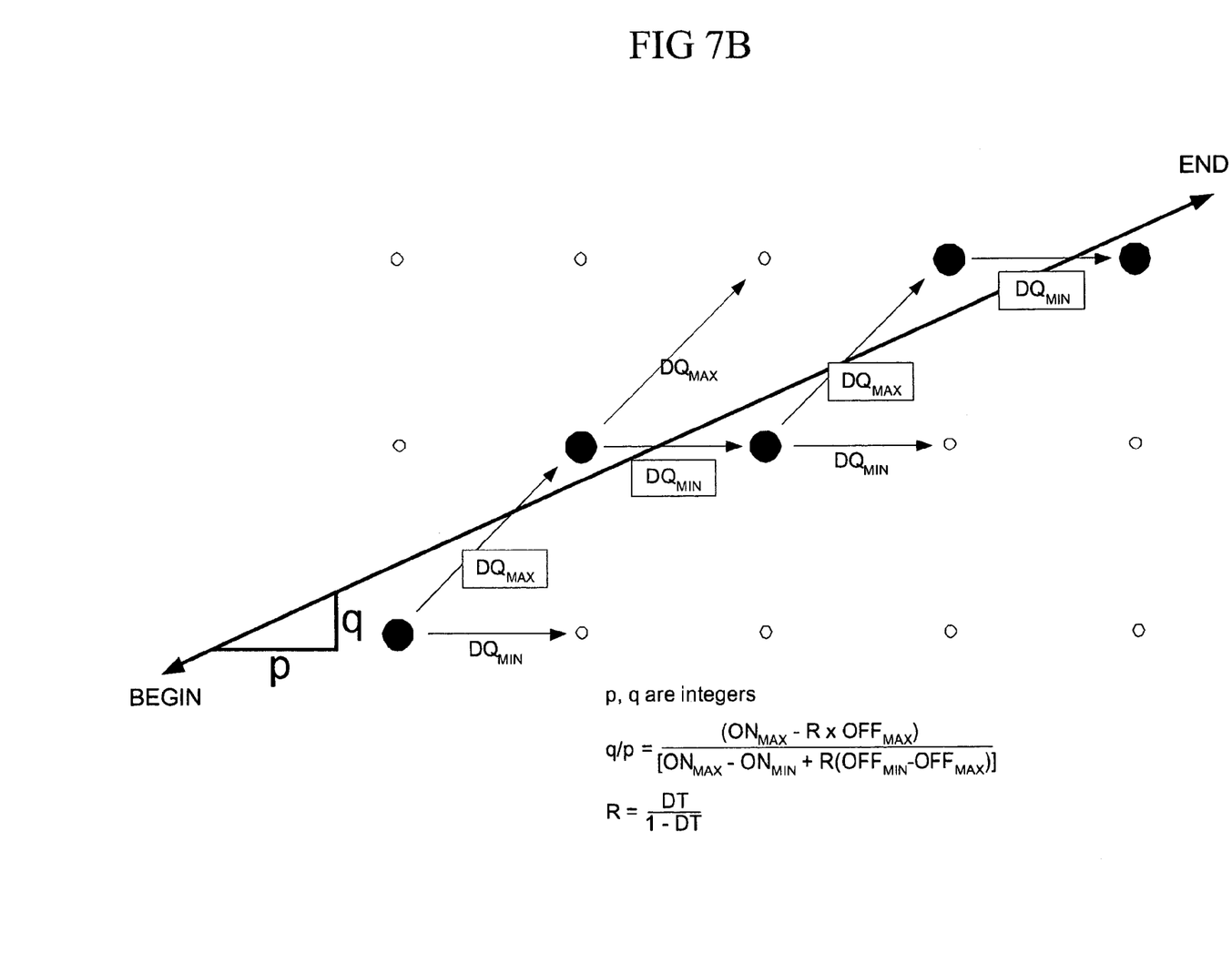
FIG. 7b is an illustration of Breshenham's Algorithm in a time-averaging duty cycle sequencer application.

The problem of sequencing quantized duty cycles DQmin and DQmax to achieve a time-averaged duty cycle of DT can be cast in the framework of the line drawing problem with the x-axis the driving axis, as shown in FIG. 7B. Whereas in the line drawing problem, Breshenham's Algorithm is applied to sequence moves (RIGHT or UP), here Breshenham's Algorithm is applied to sequence quantized duty cycles (DQmin or DQmax). Integer inputs to the algorithm, p and q, are chosen such that q/p is approximately equal to (ONmax−R×OFFmax)/((ONmax−ONmin)+R×(OFFmin−OFFmax)), where R is defined to be equal to DT/(1−DT). In practice, p might be set to 1024, and q computed (whenever DT changes) using the foregoing expression. To eliminate this setup computation, q could be precomputed and stored with DQmin and DQmax in the table of duty cycle pairs, described earlier. Once set up, the per-switching-cycle computation is identical to the trivial per-pixel computation of the line drawing application. At each switching cycle, the decision has the effect of minimizing the difference between the ratio of cumulative ON time to cumulative cycle time, and DT. Hence, the goal of time-averaging to DT is achieved.

The computational advantages of having a table of duty cycle pairs available, comes at the cost of a modest amount of memory, which is not application-dependent. The modified Breshenham algorithm eliminates the bias implicit in fixed-period time-averaging at a very modest computational cost. While the duty cycle control mechanism described above has implicit performance limitations similar in nature to those of prior art fixed-frequency duty cycle control mechanisms, the effects of finite period time-averaging and duty cycle quantization on performance are substantially reduced, without introducing application dependencies.

The duty cycle control mechanism of the converter of FIG. 5 is comprised of a target duty cycle estimator 234, a mechanism for generating, from output voltage feedback or input voltage feedforward or a combination of both, an estimate (DT) of the target duty cycle, the target duty cycle being the duty cycle essential to achieve the desired output voltage, Vdo, and a time-averaging duty cycle sequencer 254 for determining the turn ON and turn OFF times of switching device 114, in such a manner that the time-averaged value of the resultant duty cycle most closely approximates the estimated target duty cycle, DT.

In a digital implementation, the target duty cycle estimator 234 frequently takes the form of a digital PID (proportional-integral-differential) filter, operating on the output voltage error (the difference between the actual output voltage and the desired output voltage). According to the present invention, the filter may operate on input voltage in lieu of or in addition to the output voltage error.

The time-averaging duty cycle sequencer 254, constructs a sequence of cycles, mixing DQmin cycles with DQmax cycles, where DQmin and DQmax comprise a duty cycle pair, extracted from a table of duty cycle pairs 244 indexed by the estimated target duty cycle, DT. In this case, the sequencing mechanism chooses, cycle by cycle, DQmin or DQmax (and its corresponding ON time/OFF time pair), following a duty cycle sequence pattern extracted from a table of duty cycle sequence patterns 264 likewise indexed by the estimated target duty cycle, DT, to generate a sequence that time-averages to the estimated target duty cycle, DT.

The content and construction of the table of duty cycle pairs 244 is identical to that of table 243 employed in duty cycle control mechanism 203 of the converter of FIG. 4, and described in FIG. 6. The content of the table of duty cycle sequence patterns 264 is described in FIG. 8. To minimize the memory required for the table, it is postulated that the table would combine a table of sequence pattern designators with a table of sequence patterns. Accordingly, DT would be translated (if necessary) to an address for the purpose of accessing a sequence pattern designator, which in turn would be translated into an address for the purpose of accessing the associated sequence pattern. If the sequence pattern designator were a 5-bit field, and the memory were organized 5×256, the table could logically provide access to 32 patterns of 32 bits per pattern, by employing one of the sequence pattern designator bits to associate a "0" in the pattern with either DQmin or DQmax.

Figure 8:
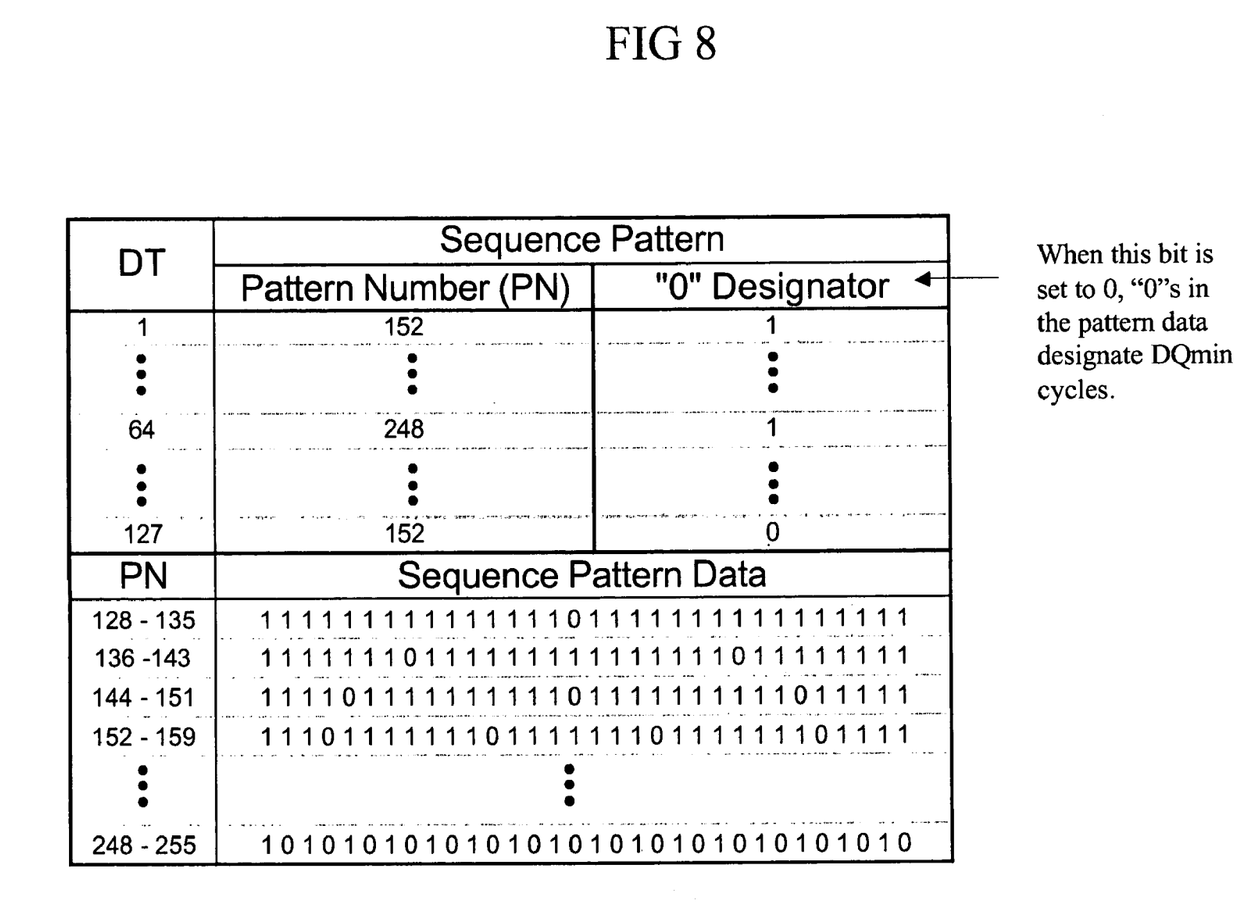
FIG. 8 is a table of duty cycle sequence patterns indexed by the estimated target duty cycle.

The task of determining sequence patterns may be accomplished in two steps: the first step being the determination of a set of 16 patterns which, together with their complements, provide 32 ways to time-average a given duty cycle pair to a target duty cycle, DT; and the second step being, for each value of DT and corresponding DQmin and DQmax, the determination of the sequence pattern which, via time-averaging, generates the duty cycle that most closely approximates DT. There is no science involved in the first step; the set is postulated to include a first pattern that contains one "0" for every thirty-one "1"s, a second pattern that contains two "0"s for every thirty "1"s, a third pattern that contains three "0"s for every twenty-nine "1"s, and so on through a sixteenth pattern that contains sixteen "0"s for every sixteen "1"s. Each of the sixteen 32-bit patterns is then constructed, distributing "0"s as uniformly as possible among the "1"s.

The second step, the association of duty cycle pairs with sequence patterns, is accomplished by observing that the duty cycle of a mix of DQmin cycles and DQmax cycles averages to DT when the ratio of DQmin cycles to DQmax cycles is equal to the ratio of DELTAmax to DELTAmin, where DELTAmin is the difference between DT and DQmin, and DELTAmax is the difference between DQmax and DT. Accordingly, the ratio of DELTAmax to DELTAmin is calculated for each value of DT; rounded to the nearest of 1/31, 2/30, 3/29, 4/28, 5/27, 6/26, and so on through 31/1; and associated, via an appropriate sequence pattern number, to the corresponding sequence pattern.

The additional computational advantages of having a table of sequence patterns as well as a table of duty cycle pairs available comes at the cost of a modest amount of additional memory, which, in this case, is not application-dependent. While the duty cycle control mechanism described above has implicit performance limitations similar in nature to those of prior art fixed-frequency duty cycle control mechanisms, the effects of finite period time-averaging and duty cycle quantization on performance are substantially reduced, without introducing application dependencies.

I claim:

1. A switched-mode DC/DC converter producing at least one output voltage (Vout), comprising:

At least one power stage (PS) for the purpose of converting an input voltage (Vin) into an output voltage (Vout), each power stage including at least one controllable switching device (CS); and A control device (CD) for the purpose of turning ON and turning OFF said controllable switching device, characterized in that Owing to the temporal resolution of the control device, $\Delta t$, both the turn ON and turn OFF times of the controllable switching device are constrained to be integral multiples of $\Delta t$; and A duty cycle control mechanism (DC) for controlling the duty cycle of said controllable switching device, comprising:

A mechanism for estimating the target duty cycle, the target duty cycle being the duty cycle essential to achieve the desired output voltage (Vdo); and A duty cycle quantization mechanism (DQ) for determining, for a target duty cycle estimate, a set of two quantized ON time/OFF time pairs suitable for controlling said controllable switching device, characterized in that the quantized ON time and OFF time of each pair (in said set) are determined independently of each other; that is, the sum of the ON time and OFF time is not fixed; and may vary, pair to pair, constrained to a set of discrete values {Tswi} (i=1, 2, . . . I) where Tswi is an integral multiple of $\Delta t$; and A sequencing mechanism (SM) for determining the turn ON and turn OFF times of said controllable switching device by choosing, cycle by cycle, an ON time/OFF time pair from said set of two ON time/OFF time pairs, choosing in such a manner that the time-averaged value of the resultant duty cycle is equivalent or nearly equivalent to the estimated target duty cycle.

2. The DC/DC converter of claim 1, wherein the converter is a buck converter.

3. The DC/DC converter of claim 1, wherein the converter is a multi-phase buck converter.

4. The DC/DC converter of claim 1, wherein the converter is a boost converter.

5. The DC/DC converter of claim 1, wherein the converter is an inverting buck-boost converter.

6. The DC/DC converter of claim 1, wherein the converter is an up-down converter.

7. The DC/DC converter of claim 1, wherein the converter is a forward converter.

8. The DC/DC converter of claim 1, wherein the converter is a flyback converter.

9. The DC/DC converter of claim 1, wherein the converter is a multi-output converter, including at least two controllable switching devices.

10. The DC/DC converter of claim 1, wherein the mechanism for estimating the target duty cycle utilizes an algorithm involving the output voltage (Vout).

11. The DC/DC converter of claim 1, wherein the mechanism for estimating the target duty cycle utilizes an algorithm involving the input voltage (Vin).

12. The DC/DC converter of claim 1, wherein the duty cycle quantization mechanism(DQ) considers the difference between the estimated target duty cycle and the duty cycle implied by a prospective ON time/OFF time pair in determining whether or not to include said prospective ON time/OFF time pair in the set of two ON time/OFF time pairs determined for said estimated target duty cycle.

13. The DC/DC converter of claim 1, wherein the duty cycle quantization mechanism (DQ) considers the difference between the estimated target duty cycle and the duty cycle implied by a prospective ON time/OFF time pair relative to the difference between the estimated target duty cycle and the duty cycle implied by each of the other prospective ON time/OFF time pairs in determining whether or not to include said prospective ON time/OFF time pair in the set of two ON time/OFF time pairs determined for said estimated target duty cycle.

14. The DC/DC converter of claim 1, wherein the duty cycle quantization mechanism (DQ) determines, for a target duty cycle estimate, a set of two ON time/Off time pairs by accessing a table (of sets) indexed by said target duty cycle estimate.

15. The DC/DC converter of claim 1, wherein the sequencing mechanism (SM) chooses, cycle by cycle, an ON time/OFF time pair from the set of two ON time/OFF time pairs, using a modified Breshenham algorithm.

16. The DC/DC converter of claim 1, wherein the sequencing mechanism (SM) chooses, cycle by cycle, an ON time/OFF time pair from the set of two ON time/OFF time pairs by following a sequence pattern extracted from a table (of sequence patterns) indexed by said target duty cycle estimate.

17. The DC/DC converter of claim 1, wherein all the sets of two ON time/OFF time pairs are constrained, by the duty cycle quantization mechanism (DQ), to prevent excessive Electromagnetic Interference (EMI).

18. The DC/DC converter of claim 17, wherein said constraint takes the form of a requirement that the switching cycles implied by all ON time/OFF time pairs differ by at most $j \times \Delta t$ (j=1, 2, . . . J).

19. The DC/DC converter of claim 1, wherein each set of at least two ON time/OFF time pairs is constrained, by the duty cycle quantization mechanism (DQ), to prevent excessive Electromagnetic Interference (EMI).

20. The DC/DC converter of claim 19, wherein said constraint takes the form of a requirement that the switching cycles implied by the ON time/OFF time pairs within any given set of at least two ON time/OFF time pairs differ by at most m×Δt (m=1, 2, . . . M).

21. The DC/DC converter of claim 1, wherein some of the functionality of the mechanism for estimating the target duty cycle is implemented in software on a microprocessor.

22. The DC/DC converter of claim 1, wherein some of the functionality of the duty cycle quantization mechanism (DQ) is implemented in software on a microprocessor.

23. The DC/DC converter of claim 1, wherein some of the functionality of the sequencing mechanism (SM) is implemented in software on a microprocessor.

24. The DC/DC converter of claim 3, wherein the sequencing mechanism (SM) further operates to insure that the sequencing of each phase of the multi-phase buck converter is accomplished in accordance with standard multi-phase practice.

25. The DC/DC converter of claim 9, wherein the sequencing mechanism (SM) further operates to insure that the controllable switching devices are not switched ON simultaneously.

26. A method of converting an input voltage to an output voltage by means of a switched-mode DC/DC converter; the input voltage (Vin) being converted into an output voltage (Vout) with the aid of a power stage (PS), including at least one controllable switch (CS), which is turned ON an turned OFF by a control device (CD) characterized in that Owing to the temporal resolution of the control device, Δt, both the turn ON and turn OFF times of the controllable switching device (CS) are constrained to be integral multiples of Δt; and A duty cycle control mechanism (DC) for controlling the duty cycle of said controllable switching device comprising:

A mechanism for estimating the target duty cycle, the target duty cycle being the duty cycle essential to achieve the desired output voltage (Vdo); and A duty cycle quantization mechanism (DQ) for determining, for a target duty cycle estimate, a set of two quantized ON time/OFF time pairs suitable for controlling said controllable switching device, characterized in that the quantized ON and OFF time of each pair (in said set) are determined independently of each other; that is, the sum of the ON time and OFF time is not fixed; and may vary, pair to pair, constrained to a set of discrete values {Tswi} (i=1, 2, . . . I) where Tswi is an integral multiple of Δt; and A sequencing mechanism (SM) for determining the turn ON and turn OFF times of said controllable switching device by choosing, cycle by cycle, an ON time/OFF time pair from said set of two ON time/OFF time pairs, choosing in such a manner that the time-averaged value of the resultant duty cycle is equivalent or nearly equivalent to the estimated target duty cycle.

* * * * *